(12) United States Patent  
Blackburn et al.

(10) Patent No.: US 8,271,899 B1  
(45) Date of Patent: Sep. 18, 2012

(54) METHOD AND SYSTEM FOR SELF-LEARNING CUSTOMIZED APPLICATION LAUNCH BASED ON HISTORICAL USAGE

(75) Inventors: Jami Ronona Blackburn, Reno, NV (US); Kyle Bradley Richmer, Reno, NV (US); Wendy Elise Moore, Sparks, NV (US); Shawna Mae Rose Scheinfeld, Sparks, NV (US); Elena Elizabeth Smith, Reno, NV (US)

(73) Assignee: Intuit Inc., Mountain View, CA (US)

( * ) Notice: Subject to any disclaimer, the term of this patent is extended or adjusted under 35 U.S.C. 154(b) by 344 days.

(21) Appl. No.: 12/626,388

(22) Filed: Nov. 25, 2009

(51) Int. Cl.  
*G06F 3/048* (2006.01)

(52) U.S. Cl. ...................... 715/789; 715/811

(58) Field of Classification Search .................. 715/709, 715/789, 810, 811  
See application file for complete search history.

(56) References Cited

U.S. PATENT DOCUMENTS

| | | | |
|---|---|---|---|
| 7,114,125 B2 * | 9/2006 | Schoettger et al. | 715/744 |
| 7,185,288 B2 * | 2/2007 | McKeever | 715/792 |
| 2003/0115550 A1 * | 6/2003 | Womble et al. | 715/517 |
| 2004/0061716 A1 * | 4/2004 | Cheung et al. | 345/710 |

* cited by examiner

*Primary Examiner* — Omar Abdul-Ali  
(74) *Attorney, Agent, or Firm* — McKay and Hodgson, LLP; Philip McKay; Sean P. Lewis

(57) ABSTRACT

A method and system for self-learning customized application launch whereby a computing system implemented application is provided for use by a given user and the given user's activities and/or interaction with the computing system implemented application are monitored. Data representing the given user's activities and/or interaction with the computing system implemented application is then analyzed to determine one or more use parameters associated with, and/or unique to, the given user's use of the given computing system implemented application. The one or more use parameters are then used to alert the user of the potential need to access the given computing system implemented application to perform one or more specific tasks and/or functions using the given computing system implemented application and/or, upon launch of the given computing system implemented application, to take the user automatically to the interface display, page, or location within the given computing system implemented application the user will need to access to perform the specific tasks and/or functions.

18 Claims, 4 Drawing Sheets

METHOD AND SYSTEM FOR SELF-LEARNING CUSTOMIZED APPLICATION LAUNCH BASED ON HISTORICAL USAGE

BACKGROUND

Currently there are a wide variety of computing system implemented applications available that are implemented, at least in part, by one or more computing systems and are accessible through one or more means such as, but not limited to: desktop computing systems; mobile computing systems; networks; web-pages, web-sites; web-based functions; computer program products; and/or any other means for accessing a computing system implemented application discussed herein, and/or as known in the art at the time of filing, and/or as developed after the time of filing. Herein, the term computing system implemented application includes, but is not limited to, any computer program, and/or code, and/or system, designed to help a user perform certain types of work or activity. Depending on the work/activity for which the computing system implemented application is designed, a computing system implemented application may manipulate/process text, numbers, graphics, or a combination of these elements. Some computing system implemented applications offer considerable computing power by focusing on a single task, such as word processing; others, called integrated software, offer somewhat less power but include several computing system implemented sub-applications.

Some examples of computing system implemented applications include, but are not limited to: computing system implemented, and/or web-based, payroll systems, packages, programs, modules, or applications; computing system implemented, and/or web-based, accounting and/or invoicing systems, packages, programs, modules, or applications; computing system implemented, and/or web-based, financial management systems, packages, programs, modules, or applications; computing system implemented, and/or web-based, banking systems, packages, programs, modules, or applications; computing system implemented, and/or web-based, personal and small business financial management systems, packages, programs, modules, or applications; computing system implemented, and/or web-based, business systems, packages, programs, modules, or applications; computing system implemented, and/or web-based, marketing device distribution systems, packages, programs, modules, or applications; computing system implemented, and/or web-based, financial institution financial management systems, packages, programs, modules, or applications; computing system implemented, and/or web-based, tax preparation systems, packages, programs, modules, or applications; computing system implemented, and/or web-based, business and/or point of sale systems, packages, programs, modules, or applications; computing system implemented, and/or web-based, healthcare management systems, packages, programs, modules, or applications; various computing system implemented, and/or web-based, gaming and/or entertainment-based systems, packages, programs, modules, or applications; a computing system implemented, and/or web-based, social networking and/or communication system, package, program, module, or application; and various other computing system implemented, and/or web-based, electronic data driven systems, packages, programs, modules, or applications, whether known at the time of filing or as developed later.

As the name implies, computing system implemented applications are typically implemented, presented, and/or accessed, at least in part, via one or more computing systems. Herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Currently, when a given computing system implemented application is activated/opened, or "launched" the user is taken to a generic startup display screen, or "page" that is the same regardless of the user's previous activity using the computing system implemented application. Then, currently, the user must often navigate through multiple display screens/pages to get to the location/user interface display within the computing system implemented application from which the user can perform a desired task/function.

The task of navigating through various, and often multiple, display screens/pages to get to the location/interface display within the computing system implemented application from which the user can perform the desired task can be very time consuming, susceptible to user error, and often frustrating, as the user is forced to load multiple display screens/pages and then take various actions to finally reach the desired user interface display. While this is a significant problem when using traditional desktop computing systems, it is even more problematic for mobile computing systems, such as cellular telephones, smart phones, digital wireless telephones, Personal Digital Assistants (PDA), media players, and Internet appliances which typically have less processing power, less bandwidth, and less available memory for downloading, processing, and displaying the multiple display screens/pages the user must currently navigate through to get to the location/user interface display within the computing system implemented application from which the user can perform the desired task.

As a result of the situation described above, users of many currently available computing system implemented applications often lose significant amounts of time and receive a diminished level of satisfaction from their computing system implemented applications, particularly in a mobile computing system environment.

SUMMARY

In accordance with one embodiment, a method and system for self-learning customized application launch includes a process for self-learning customized application launch whereby, in one embodiment, a given computing system implemented application is provided for use by a given user. In one embodiment, the given user's activities and/or interaction with the computing system implemented application are monitored and data representing the given user's activities and/or interaction with the computing system implemented application is generated and/or stored. In one embodiment, the data representing the given user's activities and/or interaction with the given computing system implemented application is analyzed to determine one or more use parameters associated with, and/or unique to, the given user's use of the given computing system implemented application. In one embodiment, the one or more use parameters associated with, and/or unique to, the given user's use of the given computing system implemented application are then used to automatically alert the user of the need to access the given computing system implemented application to perform one or more specific tasks and/or functions using the given computing system implemented application and/or, upon launch of the given computing system implemented application, to take the user automatically to the interface display, page, or location within the given computing system implemented application the user will need to access to perform the specific tasks and/or functions. Consequently, upon launch of the given computing system implemented application, any unnecessary display screens/pages are by-passed and the given user is taken directly to the location/interface display within the computing system implemented application from which the user can perform the one or more specific tasks and/or functions.

In various embodiments, the given computing system implemented application is, but is not limited to, any computer program, and/or code, and/or system, designed to help a user perform one or more various types of work or activity. In various embodiments, the given computing system implemented application may manipulate/process text, numbers, graphics, or a combination of these elements. In various embodiments, the given computing system implemented application may focus on a single task, such as word processing. In various other embodiments, the given computing system implemented application may include several computing system implemented sub-applications.

In various embodiments, the given computing system implemented application may include, but is not limited to: a computing system implemented, and/or web-based, payroll system, package, program, module, or application; a computing system implemented, and/or web-based, accounting and/or invoicing system, package, program, module, or application; a computing system implemented, and/or web-based, financial management system, package, program, module, or application; a computing system implemented, and/or web-based, banking system, package, program, module, or application; a computing system implemented, and/or web-based, personal and small business financial management system, package, program, module, or application; a computing system implemented, and/or web-based, business system, package, program, module, or application; a computing system implemented, and/or web-based, marketing device distribution system, package, program, module, or application; a computing system implemented, and/or web-based, financial institution financial management system, package, program, module, or application; a computing system implemented, and/or web-based, tax preparation system, package, program, module, or application; a computing system implemented, and/or web-based, business and/or point of sale system, package, program, module, or application; a computing system implemented, and/or web-based, healthcare management system, package, program, module, or application; a computing system implemented, and/or web-based, gaming and/or entertainment-based system, package, program, module, or application; a computing system implemented, and/or web-based, social networking and/or communication system, package, program, module, or application; and/or any other computing system implemented, and/or web-based, electronic data driven, system, package, program, module, or application, as discussed herein, and/or known at the time of filling, and/or as developed after the time of filing.

In one embodiment, the given computing system implemented application is provided for use by the given user through one or more means such as, but not limited to: one or more desktop computing systems; one or more mobile computing systems; one or more private networks; one or more public networks, such as the Internet; one or more web-pages; one or more web-sites; one or more web-based functions; one or more computer program products; and/or any combination of means for accessing a computing system implemented application as discussed herein, and/or as known in the art at the time of filing, and/or as developed after the time of filing.

Herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, the user uses the given computing system implemented application to perform various tasks and/or functions in the user's normal course of operation. In one embodiment, the user uses the given computing system implemented application to perform various tasks and/or functions in the user's normal course of operation for a defined period of time such as, but not limited to: years, half-years, quarters, months, weeks, days, hours and/or minutes.

In one embodiment, the given user's activities and/or interaction with the computing system implemented application monitored include, but are not limited to: what specific tasks and/or functions the given user performs using the given computing system implemented application and what interface display within the given computing system implemented application the user accesses to perform specific tasks and/or functions; a date, or date range, that is associated with specific recurring tasks and/or functions the given user performs using the given computing system implemented application and what interface display within the given computing system implemented application the user accesses to perform the specific recurring tasks and/or functions; a day of the week, or day range, that is associated with specific recurring tasks and/or functions the given user performs using the given computing system implemented application and what interface display within the given computing system implemented application the user accesses to perform the specific recurring tasks and/or functions; a time, or time range, that is associated with specific recurring tasks and/or functions the given user performs using the given computing system implemented application and what interface display within the given computing system implemented application the user accesses to perform the specific recurring tasks and/or functions; the given user's progress within a specific multiple step and/or level task and/or function the given user is performing using the given computing system implemented application and what interface display within the given computing system implemented application the user will need to access to continue with the specific multiple step and/or level task and/or function from the point of last use of the given computing system implemented application; specific recurring content associated with specific recurring tasks and/or functions the given user performs using the given computing system implemented application and what interface display within the given computing system implemented application the user accesses to perform the specific recurring tasks and/or functions; and/or any other use parameters associated with, and/or unique to, the given user's use of the given computing system implemented application.

In one embodiment, the given user's activities and/or interaction with the computing system implemented application are monitored under the direction of one or more processors associated with one or more computing systems.

In one embodiment, the given user's activities and/or interaction with the computing system implemented application are monitored locally on a user computing system. In one embodiment, the given user's activities and/or interaction with the computing system implemented application are monitored remotely on a computing system associated with, but not limited to, one or more of the following: a provider of the process for self-learning customized application launch; a provider of the given computing system implemented application; a provider of the means for providing the computing system implemented application; one or more users; or any third party.

In one embodiment, the given user's activities and/or interaction with the computing system implemented application are monitored for a defined period of time such as, but not limited to: years, half-years, quarters, months, weeks, days, hours and/or minutes.

In one embodiment, data representing the given user's activities and/or interaction with the computing system implemented application is generated under the direction of one or more processors associated with one or more computing systems. In one embodiment, the data representing the given user's activities and/or interaction with the computing system implemented application is stored under the direction of one or more processors associated with one or more computing systems.

In one embodiment, the data representing the given user's activities and/or interaction with the computing system implemented application is stored in whole, or in part, in a database maintained by, accessible by, owned by, or otherwise related to, but not limited to, one or more of the following: a provider of the process for self-learning customized application launch; a provider of the given computing system implemented application; a provider of the means for providing the computing system implemented application; one or more users; or any third party by any one of the numerous mechanisms known to those of skill in the art.

For instance, in various embodiments, the data, in whole, or in part, is stored in a memory system, or server memory system, or database, or in a cache memory, or in any main memory or mass memory, associated with a computing system. In one embodiment, the data, in whole, or in part, is stored in any computing system and/or server system, or other device, in another, remote, location, or on/in a computer readable medium, and/or any other computer program product, as defined herein. In one embodiment, the data, in whole, or in part, is stored on a webpage, in a web-based system or on a public network such as the Internet.

In one embodiment, the data representing the given user's activities and/or interaction with the given computing system implemented application is analyzed to determine one or more use parameters associated with, and/or unique to, the given user's use of the given computing system implemented application by defining a threshold use recurrence number, or range, such that if a given user activity and/or interaction with the given computing system implemented application occurs more than the threshold number of times, or with a threshold similarity and/or regularity, the given user activity and/or interaction with the given computing system implemented application is identified as a use parameter associated with, and/or unique to, the given user's use of the given computing system implemented application.

In one embodiment, the data representing the given user's activities and/or interaction with the given computing system implemented application is analyzed to determine one or more use parameters associated with, and/or unique to, the given user's use of the given computing system implemented application under the direction of one or more processors associated with one or more computing systems.

In one embodiment, the data representing the given user's activities and/or interaction with the given computing system implemented application is analyzed to determine one or more use parameters associated with, and/or unique to, the given user's use of the given computing system implemented application locally on a user computing system. In one embodiment, the data representing the given user's activities and/or interaction with the given computing system implemented application is analyzed to determine one or more use parameters associated with, and/or unique to, the given user's use of the given computing system implemented application remotely on a computing system associated with, but not limited to, one or more of the following: a provider of the process for self-learning customized application launch; a provider of the given computing system implemented application; a provider of the means for providing the computing system implemented application; one or more users; or any third party.

In various embodiments, the one or more use parameters associated with, and/or unique to, the given user's use of the given computing system implemented application include, but not limited to: what specific tasks and/or functions the given user performs using the given computing system implemented application and what interface display within the given computing system implemented application the user accesses to perform specific tasks and/or functions; a date, or date range, that is associated with specific recurring tasks and/or functions the given user performs using the given computing system implemented application and what interface display within the given computing system implemented application the user accesses to perform the specific recurring tasks and/or functions; a day of the week, or day range, that is associated with specific recurring tasks and/or functions the given user performs using the given computing system implemented application and what interface display within the given computing system implemented application the user accesses to perform the specific recurring tasks and/or functions; a time, or time range, that is associated with specific recurring tasks and/or functions the given user performs using the given computing system implemented application and what interface display within the given computing system implemented application the user accesses to perform the specific recurring tasks and/or functions; the given user's progress within a specific multiple step and/or level task and/or function the given user is performing using the given computing system implemented application and what interface display within the given computing system implemented application the user will need to access to continue with the specific multiple step and/or level task and/or function from the point of last use of the given computing system implemented application; specific recurring content associated with specific recurring tasks and/or functions the given user performs using the given computing system implemented application and what interface display within the given computing system implemented application the user accesses to perform the specific recurring tasks and/or functions; and/or any other use parameters associated with, and/or unique to, the given user's use of the given computing system implemented application.

In one embodiment, data representing the one or more use parameters associated with, and/or unique to, the given user's use of the given computing system implemented application is stored under the direction of one or more processors associated with one or more computing systems. In one embodiment, data representing the one or more use parameters associated with, and/or unique to, the given user's use of the given computing system implemented application is stored in whole, or in part, in a database maintained by, accessible by, owned by, or otherwise related to, but not limited to, one or more of the following: a provider of the process for self-learning customized application launch; a provider of the given computing system implemented application; a provider of the means for providing the computing system implemented application; one or more users; or any third party by any one of the numerous mechanisms known to those of skill in the art.

For instance, in various embodiments, data representing the one or more use parameters associated with, and/or unique to, the given user's use of the given computing system implemented application, in whole, or in part, is stored in a memory system, or server memory system, or database, or in a cache memory, or in any main memory or mass memory, associated with a computing system. In one embodiment, the data, in whole, or in part, is stored in any computing system and/or server system, or other device, in another, remote, location, or on/in a computer readable medium, and/or any other computer program product, as defined herein. In one embodiment, the data, in whole, or in part, is stored on a webpage, in a web-based system or on a public network such as the Internet.

In one embodiment, the one or more use parameters associated with, and/or unique to, the given user's use of the given computing system implemented application are then used to automatically alert the user of the need to access the given computing system implemented application to perform one or more specific tasks and/or functions using the given computing system implemented application.

In various embodiments, the alert generated is, but is not limited to: an e-mail alert; a text message alert; an IM alert; a phone call; a pop-up display; a calendar alert; an alert automatically sent to another application, such as Microsoft Outlook; an audio alert; a physical alert, such as a vibrating phone or pager; a printed alert; or any other means for alerting the user of the need to access the given computing system implemented application to perform one or more specific tasks and/or functions using the given computing system implemented application as discussed herein, and/or as known in the art at the time of filing, and/or as developed after the time of filing.

In various embodiments, the alert is generated under the direction of one or more processors associated with one or more computing systems.

In one embodiment the alert is generated locally on a user computing system. In one embodiment, the alert is generated remotely using a computing system associated with, but not limited to, one or more of the following: a provider of the process for self-learning customized application launch; a provider of the given computing system implemented application; a provider of the means for providing the computing system implemented application; one or more users; or any third party.

As a specific example, in one embodiment, if one of the one or more use parameters associated with, and/or unique to, the given user's use of the given computing system implemented application indicates that the user historically accesses and/or uses the given computing system implemented application within two days of the $15^{th}$ of every month, then, in this specific example, the user is alerted to the potential need to access the given computing system implemented application on, or about, the $15^{th}$ of every month.

As another specific example, in one embodiment, if one of the one or more use parameters associated with, and/or unique to, the given user's use of the given computing system implemented application indicates that the user historically accesses and/or uses the given computing system implemented application within a determined time range every two days, then, in this specific example, the user is alerted to the potential need to access the given computing system implemented application on, or about, the determined time every two days.

As another specific example, in one embodiment, if one of the one or more use parameters associated with, and/or unique to, the given user's use of the given computing system implemented application indicates that the user historically accesses and/or uses the given computing system implemented application whenever a given event occurs, such as a deposit to a given bank account, then, in this specific example, the user is alerted to the potential need to access the given computing system implemented application on, or about, the time the determined event occurs.

In one embodiment, with or without an alert, the one or more use parameters associated with, and/or unique to, the given user's use of the given computing system implemented application are used to determine which interface display, page, or location within the given computing system implemented application the user may need to access to perform specific identified tasks and/or functions and, upon launch of the given computing system implemented application, the user is taken automatically to the interface display, page, or location within the given computing system implemented application the user will likely need to access to perform specific tasks and/or functions.

In one embodiment, with or without an alert, the one or more use parameters associated with, and/or unique to, the given user's use of the given computing system implemented application are used to determine which interface display, page, or location within the given computing system implemented application the user may need to access to perform specific identified tasks and/or functions and, upon user launch of the given computing system implemented application, the user is taken automatically to the interface display, page, or location within the given computing system implemented application the user will likely need to access to perform specific tasks and/or functions.

In various embodiments, the user launches, opens, or otherwise activates the given computing system implemented application using a user interface device such as, but not limited to, a keyboard, a mouse, a touchpad, voice recognition software, or any other device and/or system capable of providing user input to a computing system and/or for translating user actions into computing system operations, whether available or known at the time of filing or as developed later.

In one embodiment, with or without an alert, the one or more use parameters associated with, and/or unique to, the given user's use of the given computing system implemented application are used to determine which interface display, page, or location within the given computing system implemented application the user may need to access to perform specific identified tasks and/or functions, the given computing system implemented application is automatically launched, and the user is taken directly to the interface display, page, or location within the given computing system implemented application the user will likely need to access to perform specific tasks and/or functions.

As a specific example, in one embodiment, one of the one or more use parameters associated with, and/or unique to, the given user's use of the given computing system implemented application indicates that the user historically accesses and/or uses the given computing system implemented application within two days of the 15$^{th}$ of every month and that the payroll run interface display of the given computing system implemented application is accessed. Then, in this specific example, the given user is provided an alert on, or about, the 15$^{th}$ of every month and, once the user responds to the alert and/or launches/activates the given computing system implemented application, the user is taken directly to the payroll run interface display.

As another specific example, in one embodiment, one of the one or more use parameters associated with, and/or unique to, the given user's use of the given computing system implemented application indicates that the user historically accesses and/or uses the given computing system implemented application within two days of the 15$^{th}$ of every month and that the payroll run interface display of the given computing system implemented application is accessed. Then, in this specific example, the given computing system implemented application is automatically accessed on, or about, the 15$^{th}$ of every month and the user is taken to the payroll run interface display upon launch.

As another specific example, in one embodiment, one of the one or more use parameters associated with, and/or unique to, the given user's use of the given computing system implemented application indicates that the user historically accesses and/or uses the given computing system implemented application within a determined time range of 11 AM on every Monday, and that the take out menu interface display of the given computing system implemented application is accessed. Then, in this specific example, the given user is provided an alert on, or about, 11 AM on every Monday and, once the user responds to the alert and/or launches/activates the given computing system implemented application, the user is taken to the take-out menu interface display.

As another specific example, in one embodiment, one of the one or more use parameters associated with, and/or unique to, the given user's use of the given computing system implemented application indicates that the user historically accesses and/or uses the given computing system implemented application within a determined time range of 11 AM on every Monday, and that the take out menu interface display of the given computing system implemented application is accessed. Then, in this specific example, the given computing system implemented application is automatically accessed on, or about, 11 AM on every Monday and the user is taken to the take-out menu interface display upon launch.

As another specific example, in one embodiment, one of the one or more use parameters associated with, and/or unique to, the given user's use of the given computing system implemented application indicates that the user historically accesses and/or uses the given computing system implemented application whenever a given event occurs, such as a deposit to a given bank account, and the user historically accesses the bill payment interface of the given computing system implemented application. Then, in this specific example, the user is alerted to the potential need to access the given computing system implemented application on, or about, the time the determined event occurs. Then, upon user launch/activation of the given computing system implemented application, the user is taken to the bill payment interface of the given computing system implemented application.

As another specific example, in one embodiment, one of the one or more use parameters associated with, and/or unique to, the given user's use of the given computing system implemented application indicates that the user historically accesses and/or uses the given computing system implemented application whenever a given event occurs, such as a deposit to a given bank account, and the user historically accesses the bill payment interface of the given computing system implemented application. Then, in this specific example, the given computing system implemented application is automatically accessed on, or about, the time the determined event occurs and the user is taken to the bill payment interface of the given computing system implemented application.

As another specific example, in one embodiment, one of the one or more use parameters associated with, and/or unique to, the given user's use of the given computing system implemented application indicates that the user previously was performing a specific multiple step and/or level task and/or function during the last use of the given computing system implemented application that is performed on a specific interface display within the given computing system implemented application. For instance, assume the given user was filling in fields of a specific interface display within the given computing system implemented application when the last use of the given computing system implemented application was terminated. Then, in this specific example, upon user launch/activation of the given computing system implemented application, the user is taken directly to the specific interface display within the given computing system implemented application the given user was using when the last use of the given computing system implemented application was terminated.

As another specific example, in one embodiment, one of the one or more use parameters associated with, and/or unique to, the given user's use of the given computing system implemented application indicates that the user previously completed finished a specific multiple step and/or level task and/or function during the last use of the given computing system implemented application that is performed on a specific interface display within the given computing system implemented application.

For instance, assume the given user exits a video game played via a given computing system implemented application at a given point/stage or mission/task of a video game. Then, in this specific example, upon user launch/activation of the given computing system implemented application, the user is taken directly to the interface display within the given computing system implemented application associated with the given point/stage, or mission/task, the given user was playing when the last use of the given computing system implemented application was terminated. As another example, assume the given user had just completed a given level, or mission/task, of a video game played via a given computing system implemented application when the last use of the given computing system implemented application was terminated. Then, in this specific example, upon user launch/activation of the given computing system implemented application, the user is taken directly to the interface display within the given computing system implemented application associated with the next level, or mission/task, after the level, or mission/task, the given user was using when the last use of the given computing system implemented application was terminated.

Using some embodiments of the method and system for self-learning customized application launch, as discussed herein, one or more use parameters associated with, and/or unique to, the given user's use of the given computing system implemented application are determined and one or more use parameters associated with, and/or unique to, the given user's use of the given computing system implemented application are used to automatically alert the user of the potential need to access the given computing system implemented application to perform one or more specific tasks and/or functions using the given computing system implemented application. Therefore, using the method and system for self-learning customized application launch, as discussed herein, the user is alerted to the potential need to access the given computing system implemented application to perform one or more specific tasks and/or functions based on data collected from the method and system for self-learning customized application launch regarding the user's actual use of the given computing system implemented application, and without any action on the user's part other than using the given computing system implemented application for his or her normal operations.

In addition, using some embodiments of the method and system for self-learning customized application launch, as discussed herein, one or more use parameters associated with, and/or unique to, the given user's use of the given computing system implemented application are determined and one or more use parameters associated with, and/or unique to, the given user's use of the given computing system implemented application are used to determine which interface display, page, or location within the given computing system implemented application the user may need to access to perform specific identified tasks and/or functions, and, with or without an alert, the user is taken directly to the interface display, page, or location within the given computing system implemented application the user will likely need to access to perform specific tasks and/or functions when the given computing system implemented application is launched, either by user action or automatically; in one embodiment, without any action on the user's part other than using the given computing system implemented application for his or her normal operations and/or, in one embodiment, launching the given computing system implemented application.

As discussed above, using embodiments of the method and system for self-learning customized application launch, upon launch of the given computing system implemented application, any unnecessary display screens/pages are by-passed and the given user is taken to the location/interface display within the computing system implemented application from which the user can perform the one or more specific tasks and/or functions. Consequently, the currently required task of navigating through various, and often multiple, display screens/pages to get to the location/interface display within the computing system implemented application from which the user can perform the desired task is eliminated without requiring any action on the user's part other than using the given computing system implemented application for his or her normal operations and/or, in one embodiment, launching the given computing system implemented application.

As discussed in more detail below, using the below embodiments, with little or no modification and/or user input, there is considerable flexibility, adaptability, and opportunity for customization to meet the specific needs of various users under numerous circumstances.

Figure 1:
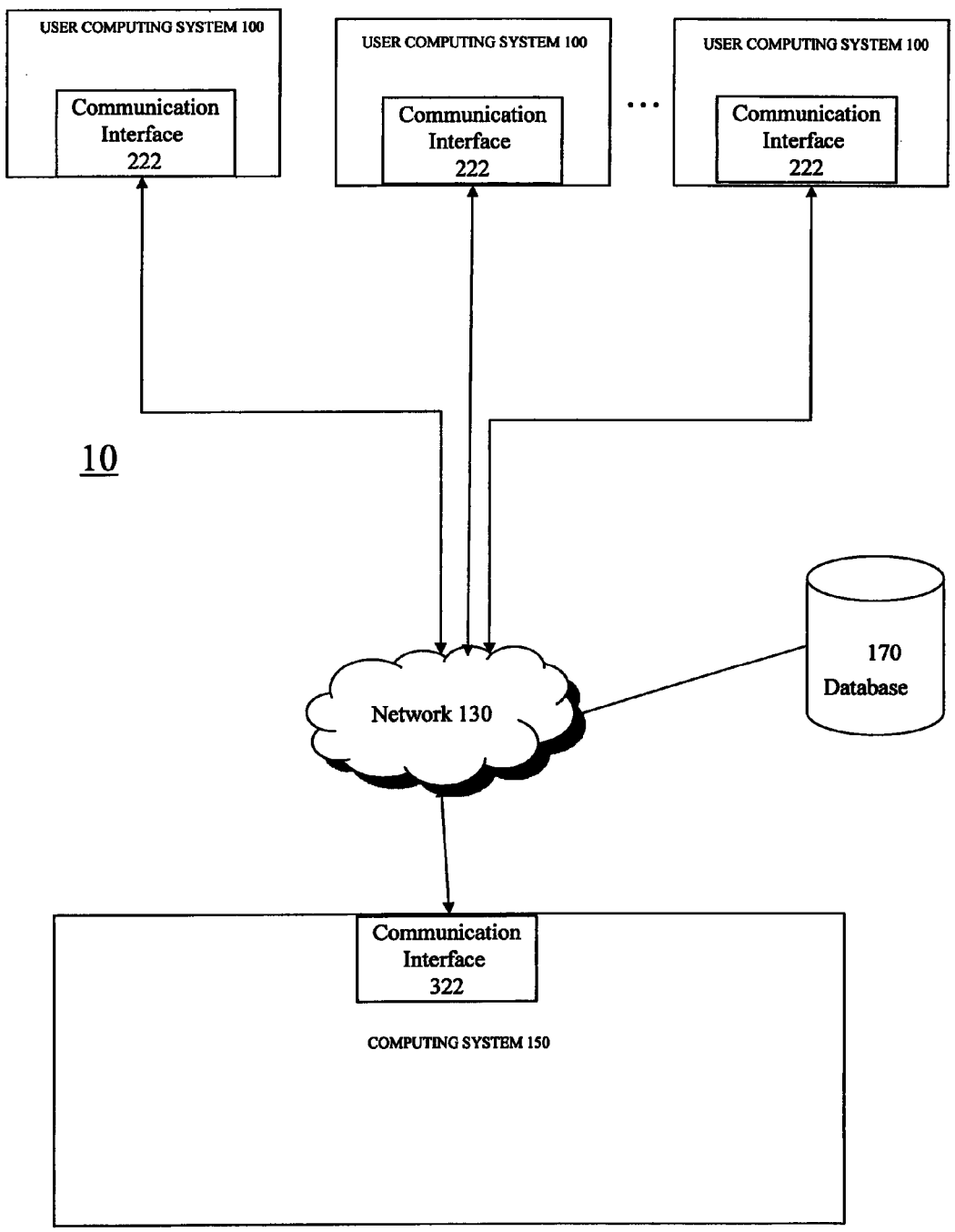
FIG. 1 is a block diagram of an exemplary hardware architecture for implementing one embodiment including user computing systems, a communication network, a database, and a computing system, in accordance with one embodiment.

Common reference numerals are used throughout the FIG. s and the detailed description to indicate like elements. One skilled in the art will readily recognize that the above FIG. s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG. s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG. s, and/or described below.

In accordance with one embodiment, a method and system for self-learning customized application launch includes a process for self-learning customized application launch whereby, in one embodiment, a given computing system implemented application is provided for use by a given user. In one embodiment, the given user's activities and/or interaction with the computing system implemented application are monitored and data representing the given user's activities and/or interaction with the computing system implemented application is generated and/or stored. In one embodiment, the data representing the given user's activities and/or interaction with the given computing system implemented application is analyzed to determine one or more use parameters associated with, and/or unique to, the given user's use of the given computing system implemented application. In one embodiment, the one or more use parameters associated with, and/or unique to, the given user's use of the given computing system implemented application are then used to automatically alert the user of the need to access the given computing system implemented application to perform one or more specific tasks and/or functions using the given computing system implemented application and/or, upon launch of the given computing system implemented application, to take the user automatically to the interface display, page, or location within the given computing system implemented application the user will need to access to perform the specific tasks and/or functions. Consequently, upon launch of the given computing system implemented application, any unnecessary display screens/pages are by-passed and the given user is taken directly to the location/interface display within the computing system implemented application from which the user can perform the one or more specific tasks and/or functions.

FIG. 1 shows a block diagram of an exemplary hardware system 10 suitable for implementing one embodiment of a process for self-learning customized application launch, such as exemplary process 400 of FIG. 4 discussed below. Returning to FIG. 1, exemplary hardware system 10 includes: one or more user computing system(s) 100, including communication interface(s) 222; computing system 150, including communication interface 322; and database 170; all communicating via communication interfaces 222 and 322 and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as computing system 150 (discussed below) or any one or more of other user computing system(s) 100.

As used herein, the term "computing system", such as is included in the terms "user computing system" and "computing system" includes, but is not limited to: a desktop computing system/computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein, and/or as known in the art at the time of filing, and/or as developed thereafter, that includes components that can execute all, or part, of a process for self-learning customized application launch in accordance with at least one of the embodiments as described herein. A more detailed discussion of user computing system(s) 100 is provided below with respect to FIG. 2.

Returning to FIG. 1, in one embodiment, computing system 150 is any computing system as defined herein and/or as known in the art at the time of filing and/or as developed thereafter, that includes components that can execute all, or part, of a process for self-learning customized application launch in accordance with at least one of the embodiments as described herein. In one embodiment, computing system 150 is associated with any, but not limited to, one or more of the following: a provider of the process for self-learning customized application launch; a provider of a given computing system implemented application; a provider of the means for providing a computing system implemented application; one or more users; or any third party.

In one embodiment, computing system 150 is representative of two or more computing systems. In one embodiment, computing system 150 is a client computing system associated with one or more server computing systems. In one embodiment, computing system 150 is a server computing system that is, in turn, associated with one or more client computing systems. In one embodiment, computing system 150 is part of a cloud computing environment. A more detailed discussion of computing system 150 is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100 and/or computing system 150, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for self-learning customized application launch, and/or a provider of a computing system 150. In one embodiment, database 170 is part of a cloud computing environment.

In one embodiment, computing system(s) 100, computing system 150, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, computing system 150, and database 170, are coupled in a cloud computing environment.

Figure 2:
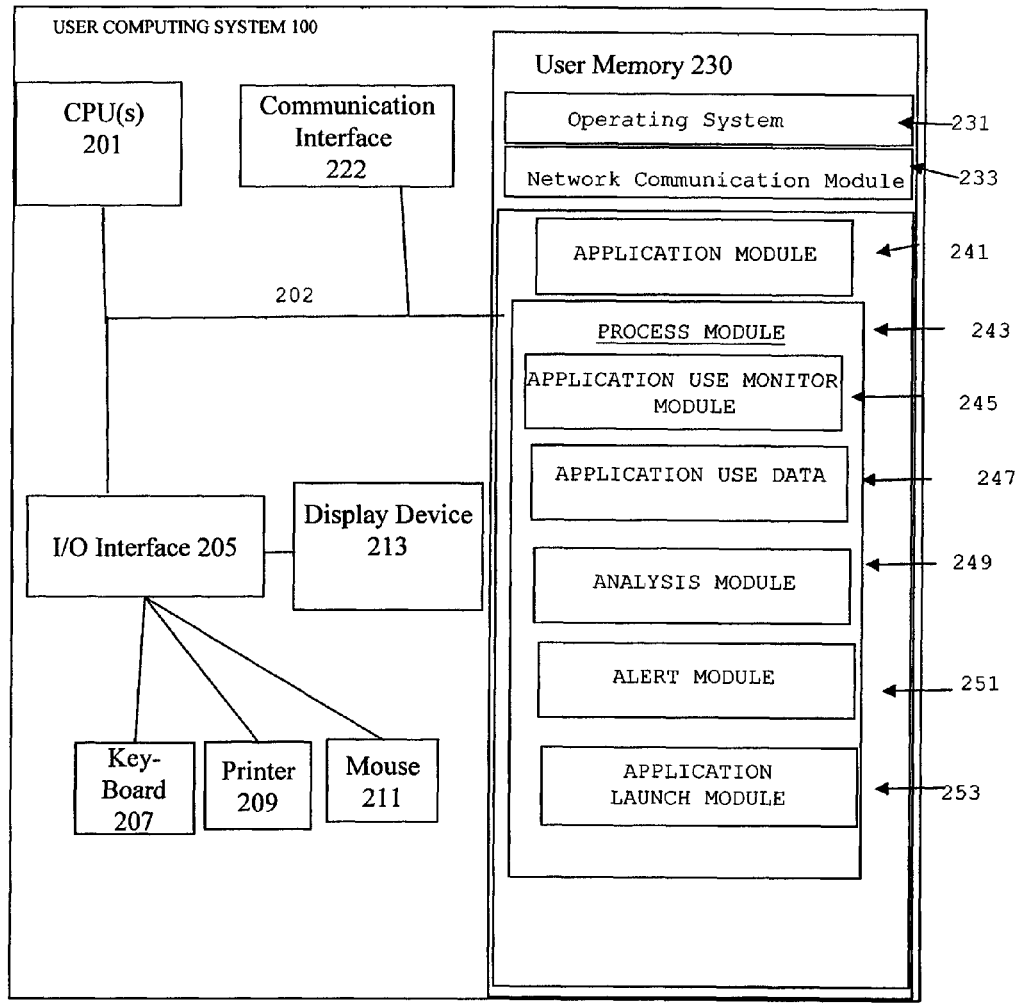
FIG. 2 is a block diagram of an exemplary user computing system of FIG. 1, in accordance with one embodiment.

FIG. 2 is a more detailed block diagram of an exemplary user computing system(s) 100. As seen in FIG. 2, in one embodiment, user computing system(s) 100 include(s) one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202.

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3): operating system 231 that includes procedures, data, and/or instructions for handling various services and performing/coordinating hardware dependent tasks; network communications module 233 that includes procedures, data, and/or instructions for, along with communication interface 222, connecting user computing system(s) 100 to other computing systems, such as other user computing system(s) 100 and/or computing system 150 of FIG. 1, and/or a network, such as network 130 of FIG. 1, and/or a database, such as database 170 of FIG. 1; application module 241 that includes procedures, data, and/or instructions for implementing at least part of a given computing system implemented application provided for use by a given user; process module 243 that includes procedures, data, and/or instructions for implementing at least part of a process for self-learning customized application launch.

As also seen in FIG. 2, in one embodiment, process module 243 of user memory 230 includes: application use monitor module 245 that includes procedures, data, and/or instructions for monitoring the given user's activities and/or interaction with the computing system implemented application of application module 241; application use data 247 that includes data representing the results of the monitoring of the given user's activities and/or interaction with the computing system implemented application of application module 241; analysis module 249 that includes procedures, data, and/or instructions for analyzing the application use data of application use data 247 and determining one or more use parameters associated with, and/or unique to, the given user's use of the given computing system implemented application of application module 241; alert module 251 that includes procedures, data, and/or instructions for using the one or more use parameters of analysis module 249 associated with, and/or unique to, the given user's use of the given computing system implemented application of application module 241 to automatically alert the user of the need to access the given computing system implemented application of application module 241 to perform one or more specific tasks and/or functions using the given computing system implemented application of application module 241; and application launch module 253 that includes procedures, data, and/or instructions for launching the given computing system implemented application of application module 241 and automatically taking the user to an interface display, page, or location within the given computing system implemented application the user will need to access to perform the specific tasks and/or functions.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system(s) 100, user memory 230, and process module 243 of user memory 230, is provided below with respect to FIG. 4.

Figure 3:
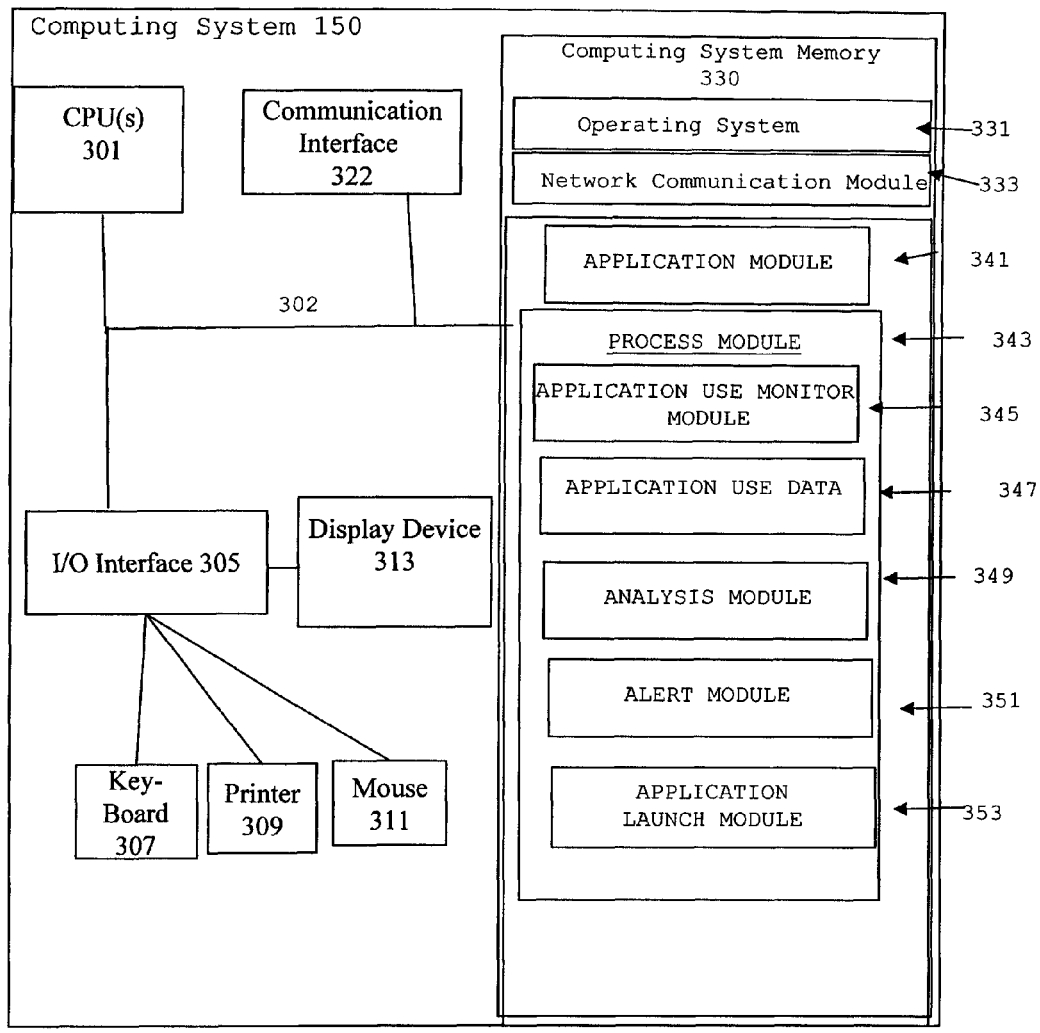
FIG. 3 is a block diagram of an exemplary computing system of FIG. 1, in accordance with one embodiment.

FIG. 3 is a more detailed block diagram of an exemplary computing system 150. As seen in FIG. 3, in one embodiment, computing system 150 includes one or more Central Processing Unit(s), CPU(s) 301; computing system memory system 330; at least one communication interface 322; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, computing system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3): operating system 331 that includes procedures, data, and/or instructions for handling various services and performing/coordinating hardware dependent tasks; network communications module 333 that includes procedures, data, and/or instructions, for, along with communication interface 322, connecting computing system 150 to other computing systems, such as user computing system(s) 100 and/or another computing system, and/or a network, such as network 130 of FIG. 1, and/or a database, such as database 170 of FIG. 1; application module 341 that includes procedures, data, and/or instructions for implementing at least part of a given computing system implemented application provided for use by a given user; process module 343 that includes procedures, data, and/or instructions for implementing at least part of a process for self-learning customized application launch.

As also seen in FIG. 3, in one embodiment, process module 343 of computing system memory system 330 includes: application use monitor module 345 that includes procedures, data, and/or instructions for monitoring the given user's activities and/or interaction with the computing system implemented application of application module 341; application use data 347 that includes data representing the results of the monitoring of the given user's activities and/or interaction with the computing system implemented application of application module 341; analysis module 349 that includes procedures, data, and/or instructions for analyzing the application use data of application use data 347 and determining one or more use parameters associated with, and/or unique to, the given user's use of the given computing system implemented application of application module 341; alert module 351 that includes procedures, data, and/or instructions for using the one or more use parameters of analysis module 349 associated with, and/or unique to, the given user's use of the given computing system implemented application of application module 341 to automatically alert the user of the need to access the given computing system implemented application of application module 341 to perform one or more specific tasks and/or functions using the given computing system implemented application of application module 341; and application launch module 353 that includes procedures, data, and/or instructions for launching the given computing system implemented application of application module 341 and automatically taking the user to an interface display, page, or location within the given computing system implemented application the user will need to access to perform the specific tasks and/or functions.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary computing system 150, computing system memory system 330, application module 341 and process module 343 is provided below with respect to FIG. 4.

Process

In accordance with one embodiment, a method and system for self-learning customized application launch includes a process for self-learning customized application launch whereby, in one embodiment, a given computing system implemented application is provided for use by a given user. In one embodiment, the given user's activities and/or interaction with the computing system implemented application are monitored and data representing the given user's activities and/or interaction with the computing system implemented application is generated and/or stored. In one embodiment, the data representing the given user's activities and/or interaction with the given computing system implemented application is analyzed to determine one or more use parameters associated with, and/or unique to, the given user's use of the given computing system implemented application. In one embodiment, the one or more use parameters associated with, and/or unique to, the given user's use of the given computing system implemented application are then used to automatically alert the user of the need to access the given computing system implemented application to perform one or more specific tasks and/or functions using the given computing system implemented application and/or, upon launch of the given computing system implemented application, to take the user automatically to the interface display, page, or location within the given computing system implemented application the user will need to access to perform the specific tasks and/or functions. Consequently, upon launch of the given computing system implemented application, any unnecessary display screens/pages are by-passed and the given user is taken directly to the location/interface display within the computing system implemented application from which the user can perform the one or more specific tasks and/or functions.

Figure 4:
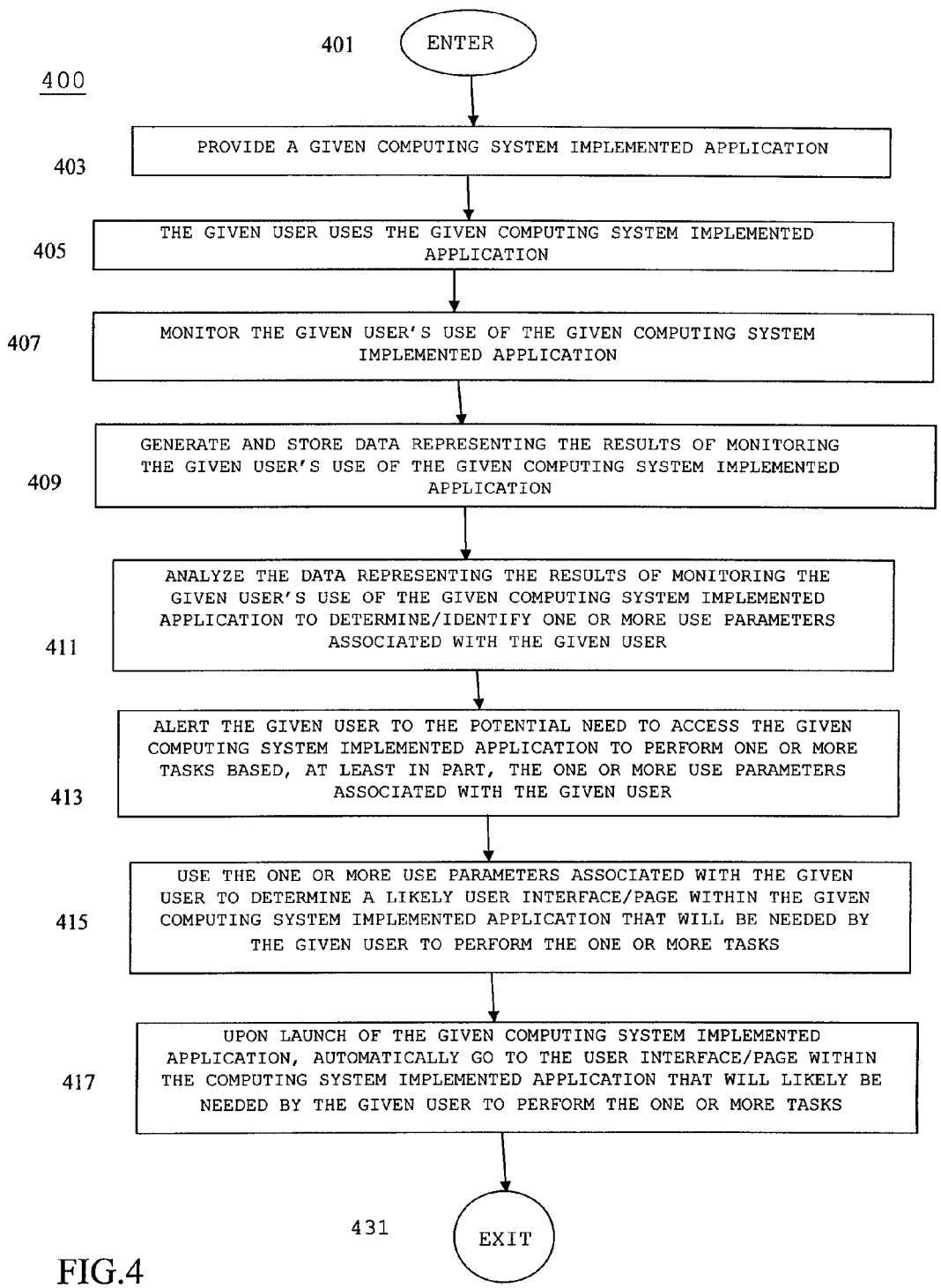
FIG. 4 is a flow chart depicting a process for self-learning customized application launch in accordance with one embodiment.

FIG. 4 is a flow chart depicting a process for self-learning customized application launch 400 in accordance with one embodiment. Process for self-learning customized application launch 400 begins at ENTER OPERATION 401 of FIG. 4 and process flow proceeds to PROVIDE A GIVEN COMPUTING SYSTEM IMPLEMENTED APPLICATION OPERATION 403.

In one embodiment, at PROVIDE A GIVEN COMPUTING SYSTEM IMPLEMENTED APPLICATION OPERATION 403 a given computing system implemented application is provided for use by a given user.

In various embodiments, the given computing system implemented application provided at PROVIDE A GIVEN COMPUTING SYSTEM IMPLEMENTED APPLICATION OPERATION 403 is, but is not limited to, any computer program, and/or code, and/or system, designed to help the given user perform one or more various types of work or activity. In various embodiments, the given computing system implemented application provided at PROVIDE A GIVEN COMPUTING SYSTEM IMPLEMENTED APPLICATION OPERATION 403 may manipulate/process text, numbers, graphics, or a combination of these elements. In various embodiments, the given computing system implemented application provided at PROVIDE A GIVEN COMPUTING SYSTEM IMPLEMENTED APPLICATION OPERATION 403 may focus on a single task, such as word processing. In various embodiments, the given computing system implemented application provided at PROVIDE A GIVEN COMPUTING SYSTEM IMPLEMENTED APPLICATION OPERATION 403 may include several computing system implemented sub-applications.

In various embodiments, the given computing system implemented application provided at PROVIDE A GIVEN COMPUTING SYSTEM IMPLEMENTED APPLICATION OPERATION 403 may include, but is not limited to: a computing system implemented, and/or web-based, payroll system, package, program, module, or application; a computing system implemented, and/or web-based, accounting and/or invoicing system, package, program, module, or application; a computing system implemented, and/or web-based, financial management system, package, program, module, or application; a computing system implemented, and/or web-based, banking system, package, program, module, or application; a computing system implemented, and/or web-based, personal and small business financial management system, package, program, module, or application; a computing system implemented, and/or web-based, business system, package, program, module, or application; a computing system implemented, and/or web-based, marketing device distribution system, package, program, module, or application; a computing system implemented, and/or web-based, financial institution financial management system, package, program, module, or application; a computing system implemented, and/or web-based, tax preparation system, package, program, module, or application; a computing system implemented, and/or web-based, business and/or point of sale system, package, program, module, or application; a computing system implemented, and/or web-based, healthcare management system, package, program, module, or application; a computing system implemented, and/or web-based, gaming and/or entertainment-based system, package, program, module, or application; a computing system implemented, and/or web-based, social networking and/or communication system, package, program, module, or application; and/or any other computing system implemented, and/or web-based, electronic data driven, system, package, program, module, or application, as discussed herein, and/or known at the time of filing, and/or as developed after the time of filing.

In one embodiment, the given computing system implemented application is provided at PROVIDE A GIVEN COMPUTING SYSTEM IMPLEMENTED APPLICATION OPERATION 403 for use by the given user through one or more means such as, but not limited to: one or more desktop computing systems; one or more mobile computing systems; one or more private networks; one or more public networks, such as the Internet; one or more web-pages; one or more web-sites; one or more web-based functions; one or more computer program products; and/or any combination of means for accessing a computing system implemented application as discussed herein, and/or as known in the art at the time of filing, and/or as developed after the time of filing.

Herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, the given computing system implemented application is provided at PROVIDE A GIVEN COMPUTING SYSTEM IMPLEMENTED APPLICATION OPERATION 403 for use by the given user through one or more computing systems such as user computing system(s) 100 of FIGS. 1 and 2 and/or computing system 150 of FIGS. 1 and 3.

Returning to FIG. 4, in one embodiment, the given computing system implemented application is provided at PROVIDE A GIVEN COMPUTING SYSTEM IMPLEMENTED APPLICATION OPERATION 403 via an application module, such as application module 241 of FIG. 2 and/or application module 341 of FIG. 3.

Returning to FIG. 4, in one embodiment, once a given computing system implemented application is provided for use by a given user at PROVIDE A GIVEN COMPUTING SYSTEM IMPLEMENTED APPLICATION OPERATION 403 process flow proceeds to THE GIVEN USER USES THE GIVEN COMPUTING SYSTEM IMPLEMENTED APPLICATION OPERATION 405.

In one embodiment, at THE GIVEN USER USES THE GIVEN COMPUTING SYSTEM IMPLEMENTED APPLICATION OPERATION 405 the given user uses the given computing system implemented application of PROVIDE A GIVEN COMPUTING SYSTEM IMPLEMENTED APPLICATION OPERATION 403 to perform various tasks and/or functions in the user's normal course of operation.

In one embodiment at THE GIVEN USER USES THE GIVEN COMPUTING SYSTEM IMPLEMENTED APPLICATION OPERATION 405 the given user uses the given computing system implemented application of PROVIDE A GIVEN COMPUTING SYSTEM IMPLEMENTED APPLICATION OPERATION 403 to perform various tasks and/or functions in the user's normal course of operation for a defined period of time such as, but not limited to: years, half-years, quarters, months, weeks, days, hours and/or minutes.

In one embodiment, once the given user uses the given computing system implemented application of PROVIDE A GIVEN COMPUTING SYSTEM IMPLEMENTED APPLICATION OPERATION 403 to perform various tasks and/or functions in the user's normal course of operation at THE GIVEN USER USES THE GIVEN COMPUTING SYSTEM IMPLEMENTED APPLICATION OPERATION 405, process flow proceeds to MONITOR THE GIVEN USER'S USE OF THE GIVEN COMPUTING SYSTEM IMPLEMENTED APPLICATION OPERATION 407.

In one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 are monitored.

In one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 are monitored under the direction of, and/or by, one or more processors, such as CPU(s) 201 and/or 301, associated with one or more computing systems, such as user computing system(s) 100 and/or computing system 150 of FIGS. 1, 2, and 3.

Returning to FIG. 4, in one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 are monitored locally on a user computing system, such as user computing system(s) 100 of FIGS. 1 and 2.

Returning to FIG. 4, in one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 are monitored using a application use monitor module, such as application use monitor module 245 of FIG. 2.

Returning to FIG. 4, in one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 are monitored remotely on a computing system, such as computing system 150 of FIGS. 1 and 3, associated with, but not limited to, one or more of the following: a provider of the process for self-learning customized application launch; a provider of the given computing system implemented application; a provider of the means for providing the computing system implemented application; one or more users; or any third party.

Returning to FIG. 4, in one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 are monitored using a application use monitor module, such as application use monitor module 345 of FIG. 3.

Returning to FIG. 4, in one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 monitored include, but are not limited to, what specific tasks and/or functions the given user performs using the given computing system implemented application and what interface display within the given computing system implemented application the user accesses to perform specific tasks and/or functions.

In one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 monitored include, but are not limited to, a date, or date range, that is associated with specific recurring tasks and/or functions the given user performs using the given computing system implemented application and what interface display within the given computing system implemented application the user accesses to perform the specific recurring tasks and/or functions.

In one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 monitored include, but are not limited to, a day of the week, or day range, that is associated with specific recurring tasks and/or functions the given user performs using the given computing system implemented application and what interface display within the given computing system implemented application the user accesses to perform the specific recurring tasks and/or functions.

In one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 monitored include, but are not limited to, a time, or time range, that is associated with specific recurring tasks and/or functions the given user performs using the given computing system implemented application and what interface display within the given computing system implemented application the user accesses to perform the specific recurring tasks and/or functions.

In one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 monitored include, but are not limited to, the given user's progress within a specific multiple step and/or level task and/or function the given user is performing using the given computing system implemented application and what interface display within the given computing system implemented application the user will need to access to continue with the specific multiple step and/or level task and/or function from the point of last use of the given computing system implemented application.

In one embodiment, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 monitored include, but are not limited to, specific recurring content associated with specific recurring tasks and/or functions the given user performs using the given computing system implemented application and what interface display within the given computing system implemented application the user accesses to perform the specific recurring tasks and/or functions.

In various embodiments, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 monitored include, but are not limited to, any other use parameters associated with, and/or unique to, the given user's use of the given computing system implemented application.

In various embodiments, at MONITOR THE GIVEN USER'S USE OF THE GIVEN COMPUTING SYSTEM IMPLEMENTED APPLICATION OPERATION 407 the given user's activities and/or interaction with the computing system implemented application of THE GIVEN USER USES THE GIVEN COMPUTING SYSTEM IMPLEMENTED APPLICATION OPERATION 405 are monitored for a defined period of time such as, but not limited to: years, half-years, quarters, months, weeks, days, hours and/or minutes.

In one embodiment, once the given user's activities and/or interaction with the computing system implemented application of THE GIVEN USER USES THE GIVEN COMPUTING SYSTEM IMPLEMENTED APPLICATION OPERATION 405 are monitored at MONITOR THE GIVEN USER'S USE OF THE GIVEN COMPUTING SYSTEM IMPLEMENTED APPLICATION OPERATION 407 process flow proceeds to GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409.

In one embodiment, at GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409 data representing the given user's monitored activities and/or interaction with the computing system implemented application of MONITOR THE GIVEN USER'S USE OF THE GIVEN COMPUTING SYSTEM IMPLEMENTED APPLICATION OPERATION 407 is generated and/or stored.

In one embodiment, at GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409 data representing the given user's monitored activities and/or interaction with the computing system implemented application of MONITOR THE GIVEN USER'S USE OF THE GIVEN COMPUTING SYSTEM IMPLEMENTED APPLICATION OPERATION 407 is generated under the direction of, and/or by, one or more processors, such as CPU(s) 201 and/or 301, associated with one or more computing systems, such as user computing system(s) 100 and/or computing system 150 of FIGS. 1, 2, and 3.

In one embodiment, at GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409 the data representing the given user's monitored activities and/or interaction with the computing system implemented application of MONITOR THE GIVEN USER'S USE OF THE GIVEN COMPUTING SYSTEM IMPLEMENTED APPLICATION OPERATION 407 is stored in whole, or in part, in a database, such as database 170 of FIG. 1, maintained by, accessible by, owned by, or otherwise related to, but not limited to, one or more of the following: a provider of the process for self-learning customized application launch; a provider of the given computing system implemented application; a provider of the means for providing the computing system implemented application; one or more users; or any third party by any one of the numerous mechanisms known to those of skill in the art.

In various embodiments, at GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409 the data representing the given user's monitored activities and/or interaction with the computing system implemented application of MONITOR THE GIVEN USER'S USE OF THE GIVEN COMPUTING SYSTEM IMPLEMENTED APPLICATION OPERATION 407, in whole, or in part, is stored in a memory system, or server memory system, or database, or in a cache memory, or in any main memory or mass memory, associated with a computing system, such as computing systems 100 and/or 150 of FIGS. 1, 2, and 3.

In one embodiment, at GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409 the data representing the given user's monitored activities and/or interaction with the computing system implemented application of MONITOR THE GIVEN USER'S USE OF THE GIVEN COMPUTING SYSTEM IMPLEMENTED APPLICATION OPERATION 407, in whole, or in part, is stored in any computing system and/or server system, or other device, in another, remote, location, or on/in a computer readable medium, and/or any other computer program product, as defined herein.

In one embodiment, at GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409 the data representing the given user's monitored activities and/or interaction with the computing system implemented application of MONITOR THE GIVEN USER'S USE OF THE GIVEN COMPUTING SYSTEM IMPLEMENTED APPLICATION OPERATION 407, in whole, or in part, is stored on a webpage, in a web-based system or on a public network such as the Internet.

In one embodiment, at GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409 the data representing the given user's monitored activities and/or interaction with the computing system implemented application of MONITOR THE GIVEN USER'S USE OF THE GIVEN COMPUTING SYSTEM IMPLEMENTED APPLICATION OPERATION 407, in whole, or in part, is stored as application use data, such as application use data 247 of FIG. 2 and/or application use data 347 of FIG. 3.

In various embodiments, at GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409 the data representing the given user's monitored activities and/or interaction with the computing system implemented application of MONITOR THE GIVEN USER'S USE OF THE GIVEN COMPUTING SYSTEM IMPLEMENTED APPLICATION OPERATION 407, in whole, or in part, is stored using any means, mechanism, process, and/or procedure for storing data as discussed herein, and/or as known in the art at the time of filing, and/or as developed after the time of filing.

In one embodiment, once data representing the given user's monitored activities and/or interaction with the computing system implemented application of MONITOR THE GIVEN USER'S USE OF THE GIVEN COMPUTING SYSTEM IMPLEMENTED APPLICATION OPERATION 407 is generated and/or stored at GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409 process flow proceeds to ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411.

In one embodiment, at ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411 the data representing the given user's monitored activities and/or interaction with the given computing system implemented application of GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409 is analyzed to determine one or more use parameters associated with, and/or unique to, the given user's use of the given computing system implemented application of PROVIDE A GIVEN COMPUTING SYSTEM IMPLEMENTED APPLICATION OPERATION 403.

In one embodiment, at ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411 the data representing the given user's monitored activities and/or interaction with the given computing system implemented application is analyzed to determine one or more use parameters associated with, and/or unique to, the given user's use of the given computing system implemented application by defining a threshold use recurrence number or range such that if a given user activity and/or interaction with the given computing system implemented application occurs more than the threshold number of times, or with a threshold similarity and/or regularity, the given user activity and/or interaction with the given computing system implemented application is identified as a use parameter associated with, and/or unique to, the given user's use of the given computing system implemented application.

In one embodiment, at ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411 the data representing the given user's monitored activities and/or interaction with the given computing system implemented application is analyzed to determine one or more use parameters associated with, and/or unique to, the given user's use of the given computing system implemented application under the direction of, and/or by, one or more processors, such as CPU(s) 201 and/or 301, associated with one or more computing systems, such as user computing system(s) 100 and/or computing system 150 of FIGS. 1, 2, and 3.

Returning to FIG. 4, in one embodiment, at ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411 the data representing the given user's activities and/or interaction with the given computing system implemented application is analyzed to determine one or more use parameters associated with, and/or unique to, the given user's use of the given computing system implemented application locally on a user computing system, such as user computing system(s) 100 of FIGS. 1 and 2.

Returning to FIG. 4 in one embodiment, at ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411 the data representing the given user's activities and/or interaction with the given computing system implemented application is analyzed to determine one or more use parameters associated with, and/or unique to, the given user's use of the given computing system implemented application remotely on a computing system, such as computing system 150 of FIGS. 1 and 3, associated with, but not limited to, one or more of the following: a provider of the process for self-learning customized application launch; a provider of the given computing system implemented application; a provider of the means for providing the computing system implemented application; one or more users; or any third party.

In one embodiment, at ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411 the data representing the given user's activities and/or interaction with the given computing system implemented application is analyzed to determine one or more use parameters associated with, and/or unique to, the given user's use of the given computing system implemented application using an analysis module, such as analysis module 251 of FIG. 2 and/or analysis module 351 of FIG. 3.

Returning to FIG. 4, in various embodiments, the one or more use parameters associated with, and/or unique to, the given user's use of the given computing system implemented application include, but not limited to: what specific tasks and/or functions the given user performs using the given computing system implemented application and what interface display within the given computing system implemented application the user accesses to perform specific tasks and/or functions; a date, or date range, that is associated with specific recurring tasks and/or functions the given user performs using the given computing system implemented application and what interface display within the given computing system implemented application the user accesses to perform the specific recurring tasks and/or functions; a day of the week, or day range, that is associated with specific recurring tasks and/or functions the given user performs using the given computing system implemented application and what interface display within the given computing system implemented application the user accesses to perform the specific recurring tasks and/or functions; a time, or time range, that is associated with specific recurring tasks and/or functions the given user performs using the given computing system implemented application and what interface display within the given computing system implemented application the user accesses to perform the specific recurring tasks and/or functions; the given user's progress within a specific multiple step and/or level task and/or function the given user is performing using the given computing system implemented application and what interface display within the given computing system implemented application the user will need to access to continue with the specific multiple step and/or level task and/or function from the point of last use of the given computing system implemented application; specific recurring content associated with specific recurring tasks and/or functions the given user performs using the given computing system implemented application and what interface display within the given computing system implemented application the user accesses to perform the specific recurring tasks and/or functions; and/or any other use parameters associated with, and/or unique to, the given user's use of the given computing system implemented application.

In one embodiment, at ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411, data representing the one or more use parameters associated with, and/or unique to, the given user's use of the given computing system implemented application is stored using any means, mechanism, process and/or procedure for storing data as discussed herein, and/or as known in the art at the time of filing, and/or as developed after the time of filing.

In one embodiment, once the data representing the given user's monitored activities and/or interaction with the given computing system implemented application of GENERATE AND STORE DATA REPRESENTING THE RESULTS OF MONITORING THE GIVEN USER'S USE OF THE GIVEN COMPUTING SYSTEM IMPLEMENTED APPLICATION OPERATION 409 is analyzed to determine one or more use parameters associated with, and/or unique to, the given user's use of the given computing system implemented application of PROVIDE A GIVEN COMPUTING SYSTEM IMPLEMENTED APPLICATION OPERATION 403 at ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411, process flow proceeds to ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413.

In one embodiment, at ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413 the one or more use parameters associated with, and/or unique to, the given user's use of the given computing system implemented application of ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411 are used to automatically alert the user of the need to access the given computing system implemented application of PROVIDE A GIVEN COMPUTING SYSTEM IMPLEMENTED APPLICATION OPERATION 403 to perform one or more specific tasks and/or functions using the given computing system implemented application.

In various embodiments, the alert generated at ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413 is, but is not limited to: an e-mail alert; a text message alert; an IM alert; a phone call; a pop-up display; a calendar alert; an alert automatically sent to another application, such as Microsoft Outlook; a printed alert; or any other means for alerting the user of the need to access the given computing system implemented application to perform one or more specific tasks and/or functions using the given computing system implemented application as discussed herein, and/or as known in the art at the time of filing, and/or as developed after the time of filing.

In various embodiments, at ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413 the alert is generated under the direction of, and/or by, one or more processors, such as CPU(s) 201 and/or 301, associated with one or more computing systems, such as user computing system(s) 100 and/or computing system 150 of FIGS. 1, 2, and 3.

Returning to FIG. 4, in various embodiments, at ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413 the alert is generated locally on a user computing system, such as user computing system(s) 100 of FIGS. 1 and 2.

Returning to FIG. 4, in various embodiments, at ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413 the alert is generated remotely on a computing system, such as computing system 150 of FIGS. 1 and 3, associated with, but not limited to, one or more of the following: a provider of the process for self-learning customized application launch; a provider of the given computing system implemented application; a provider of the means for providing the computing system implemented application; one or more users; or any third party.

Returning to FIG. 4, in various embodiments, at ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413 the alert is generated using an alert module, such as alert module 251 of FIG. 2 and/or alert module 351 of FIG. 3.

As a specific example, in one embodiment, if one of the one or more use parameters associated with, and/or unique to, the given user's use of the given computing system implemented application indicates that the user historically accesses and/or uses the given computing system implemented application within two days of the $15^{th}$ of every month, then, in this specific example, the user is alerted to the potential need to access the given computing system implemented application on, or about, the $15^{th}$ of every month.

As another specific example, in one embodiment, if one of the one or more use parameters associated with, and/or unique to, the given user's use of the given computing system implemented application indicates that the user historically accesses and/or uses the given computing system implemented application within a determined time range every two days, then, in this specific example, the user is alerted to the potential need to access the given computing system implemented application on, or about, the determined time every two days.

As another specific example, in one embodiment, if one of the one or more use parameters associated with, and/or unique to, the given user's use of the given computing system implemented application indicates that the user historically accesses and/or uses the given computing system implemented application whenever a given event occurs, such as a deposit to a given bank account, then, in this specific example, the user is alerted to the potential need to access the given computing system implemented application on, or about, the time the determined event occurs.

In one embodiment, once the one or more use parameters associated with, and/or unique to, the given user's use of the given computing system implemented application of ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411 are used to automatically alert the user of the need to access the given computing system implemented application of PROVIDE A GIVEN COMPUTING SYSTEM IMPLEMENTED APPLICATION OPERATION 403 to perform one or more specific tasks and/or functions using the given computing system implemented application at ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413, process flow proceeds to USE THE ONE OR MORE USE PARAMETERS ASSOCIATED WITH THE GIVEN USER TO DETERMINE A LIKELY USER INTERFACE/PAGE WITHIN THE GIVEN COMPUTING SYSTEM IMPLEMENTED APPLICATION THAT WILL BE NEEDED BY THE GIVEN USER TO PERFORM THE ONE OR MORE TASKS OPERATION 415.

In one embodiment, at USE THE ONE OR MORE USE PARAMETERS ASSOCIATED WITH THE GIVEN USER TO DETERMINE A LIKELY USER INTERFACE/PAGE WITHIN THE GIVEN COMPUTING SYSTEM IMPLEMENTED APPLICATION THAT WILL BE NEEDED BY THE GIVEN USER TO PERFORM THE ONE OR MORE TASKS OPERATION 415, with or without an alert being generated at ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413, the one or more use parameters associated with, and/or unique to, the given user's use of the given computing system implemented application of ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411 are used to determine which interface display, page, or location within the given computing system implemented application of PROVIDE A GIVEN COMPUTING SYSTEM IMPLEMENTED APPLICATION OPERATION 403 the given user may need to access to perform the specific identified tasks and/or functions of ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413.

In one embodiment, once, with or without an alert being generated at ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413, the one or more use parameters associated with, and/or unique to, the given user's use of the given computing system implemented application of ANALYZE THE DATA REPRESENTING THE RESULTS OF MONITORING THE GIVEN USER'S USE OF THE GIVEN COMPUTING SYSTEM IMPLEMENTED APPLICATION TO DETERMINE/IDENTIFY ONE OR MORE USE PARAMETERS ASSOCIATED WITH THE GIVEN USER OPERATION 411 are used to determine which interface display, page, or location within the given computing system implemented application of PROVIDE A GIVEN COMPUTING SYSTEM IMPLEMENTED APPLICATION OPERATION 403 the given user may need to access to perform the specific identified tasks and/or functions of ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413 at USE THE ONE OR MORE USE PARAMETERS ASSOCIATED WITH THE GIVEN USER TO DETERMINE A LIKELY USER INTERFACE/PAGE WITHIN THE GIVEN COMPUTING SYSTEM IMPLEMENTED APPLICATION THAT WILL BE NEEDED BY THE GIVEN USER TO PERFORM THE ONE OR MORE TASKS OPERATION 415 process flow proceeds to UPON LAUNCH OF THE GIVEN COMPUTING SYSTEM IMPLEMENTED APPLICATION, AUTOMATICALLY GO TO THE USER INTERFACE/PAGE WITHIN THE COMPUTING SYSTEM IMPLEMENTED APPLICATION THAT WILL LIKELY BE NEEDED BY THE GIVEN USER TO PERFORM THE ONE OR MORE TASKS OPERATION 417.

In one embodiment, at UPON LAUNCH OF THE GIVEN COMPUTING SYSTEM IMPLEMENTED APPLICATION, AUTOMATICALLY GO TO THE USER INTERFACE/PAGE WITHIN THE COMPUTING SYSTEM IMPLEMENTED APPLICATION THAT WILL LIKELY BE NEEDED BY THE GIVEN USER TO PERFORM THE ONE OR MORE TASKS OPERATION 417, once the one or more use parameters associated with, and/or unique to, the given user's use of the given computing system implemented application are used to determine which interface display, page, or location within the given computing system implemented application the user may need to access to perform specific identified tasks and/or functions at USE THE ONE OR MORE USE PARAMETERS ASSOCIATED WITH THE GIVEN USER TO DETERMINE A LIKELY USER INTERFACE/PAGE WITHIN THE GIVEN COMPUTING SYSTEM IMPLEMENTED APPLICATION THAT WILL BE NEEDED BY THE GIVEN USER TO PERFORM THE ONE OR MORE TASKS OPERATION 415, then, with or without an alert being generated at ALERT THE GIVEN USER TO THE POTENTIAL NEED TO ACCESS THE GIVEN COMPUTING SYSTEM IMPLEMENTED APPLICATION TO PERFORM ONE OR MORE TASKS BASED, AT LEAST IN PART, THE ONE OR MORE USE PARAMETERS ASSOCIATED WITH THE GIVEN USER OPERATION 413, upon launch of the given computing system implemented application of PROVIDE A GIVEN COMPUTING SYSTEM IMPLEMENTED APPLICATION OPERATION 403, the given user is taken automatically to the interface display, page, or location within the given computing system implemented application the user will likely need to access to perform the specific tasks and/or functions of USE THE ONE OR MORE USE PARAMETERS ASSOCIATED WITH THE GIVEN USER TO DETERMINE A LIKELY USER INTERFACE/PAGE WITHIN THE GIVEN COMPUTING SYSTEM IMPLEMENTED APPLICATION THAT WILL BE NEEDED BY THE GIVEN USER TO PERFORM THE ONE OR MORE TASKS OPERATION 415.

In various embodiments, at UPON LAUNCH OF THE GIVEN COMPUTING SYSTEM IMPLEMENTED APPLICATION, AUTOMATICALLY GO TO THE USER INTERFACE/PAGE WITHIN THE COMPUTING SYSTEM IMPLEMENTED APPLICATION THAT WILL LIKELY BE NEEDED BY THE GIVEN USER TO PERFORM THE ONE OR MORE TASKS OPERATION 417 the user launches, opens, or otherwise activates, the given computing system implemented application using a user interface device such as, but not limited to, a keyboard, a mouse, a touchpad, voice recognition software, or any other device and/or system capable of providing user input to a computing system and/or for translating user actions into computing system operations, whether available or known at the time of filing or as developed later.

In one embodiment, at UPON LAUNCH OF THE GIVEN COMPUTING SYSTEM IMPLEMENTED APPLICATION, AUTOMATICALLY GO TO THE USER INTERFACE/PAGE WITHIN THE COMPUTING SYSTEM IMPLEMENTED APPLICATION THAT WILL LIKELY BE NEEDED BY THE GIVEN USER TO PERFORM THE ONE OR MORE TASKS OPERATION 417, with or without an alert, once the one or more use parameters associated with, and/or unique to, the given user's use of the given computing system implemented application are used to determine which interface display, page, or location within the given computing system implemented application the user may need to access to perform specific identified tasks and/or functions, the given computing system implemented application is automatically launched, and the user is taken directly to the interface display, page, or location within the given computing system implemented application the user will likely need to access to perform specific tasks and/or functions.

As a specific example, in one embodiment, one of the one or more use parameters associated with, and/or unique to, the given user's use of the given computing system implemented application indicates that the user historically accesses and/or uses the given computing system implemented application within two days of the $15^{th}$ of every month and that the payroll run interface display of the given computing system implemented application is accessed. Then, in this specific example, the given user is provided an alert on, or about, the 15$^{th}$ of every month and, once the user responds to the alert and/or launches/activates the given computing system implemented application, the user is taken directly to the payroll run interface display.

As another specific example, in one embodiment, one of the one or more use parameters associated with, and/or unique to, the given user's use of the given computing system implemented application indicates that the user historically accesses and/or uses the given computing system implemented application within two days of the 15$^{th}$ of every month and that the payroll run interface display of the given computing system implemented application is accessed. Then, in this specific example, the given computing system implemented application is automatically accessed on, or about, the 15$^{th}$ of every month and the user is taken directly to the payroll run interface display.

As another specific example, in one embodiment, one of the one or more use parameters associated with, and/or unique to, the given user's use of the given computing system implemented application indicates that the user historically accesses and/or uses the given computing system implemented application within a determined time range of 11 AM on every Monday, and that the take out menu interface display of the given computing system implemented application is accessed. Then, in this specific example, the given user is provided an alert on, or about, 11 AM on every Monday and, once the user responds to the alert and/or launches/activates the given computing system implemented application, the user is taken directly to the take-out menu interface display.

As another specific example, in one embodiment, one of the one or more use parameters associated with, and/or unique to, the given user's use of the given computing system implemented application indicates that the user historically accesses and/or uses the given computing system implemented application within a determined time range of 11 AM on every Monday, and that the take out menu interface display of the given computing system implemented application is accessed. Then, in this specific example, the given computing system implemented application is automatically accessed on, or about, 11 AM on every Monday and the user is taken directly to the take-out menu interface display.

As another specific example, in one embodiment, one of the one or more use parameters associated with, and/or unique to, the given user's use of the given computing system implemented application indicates that the user historically accesses and/or uses the given computing system implemented application whenever a given event occurs, such as a deposit to a given bank account, and the user historically accesses the bill payment interface of the given computing system implemented application. Then, in this specific example, the user is alerted to the potential need to access the given computing system implemented application on, or about, the time the determined event occurs. Then, upon user launch/activation of the given computing system implemented application, the user is taken directly to the bill payment interface of the given computing system implemented application.

As another specific example, in one embodiment, one of the one or more use parameters associated with, and/or unique to, the given user's use of the given computing system implemented application indicates that the user historically accesses and/or uses the given computing system implemented application whenever a given event occurs, such as a deposit to a given bank account, and the user historically accesses the bill payment interface of the given computing system implemented application. Then, in this specific example, the given computing system implemented application is automatically accessed on, or about, the time the determined event occurs and the user is taken directly to the bill payment interface of the given computing system implemented application.

As another specific example, in one embodiment, one of the one or more use parameters associated with, and/or unique to, the given user's use of the given computing system implemented application indicates that the user previously was performing a specific multiple step and/or level task and/or function during the last use of the given computing system implemented application that is performed on a specific interface display within the given computing system implemented application. For instance, assume the given user was filling in fields of a specific interface display within the given computing system implemented application when the last use of the given computing system implemented application was terminated. Then, in this specific example, upon user launch/activation of the given computing system implemented application, the user is taken directly to the specific interface display within the given computing system implemented application the given user was using when the last use of the given computing system implemented application was terminated.

As another specific example, in one embodiment, one of the one or more use parameters associated with, and/or unique to, the given user's use of the given computing system implemented application indicates that the user previously completed a specific multiple step and/or level task and/or function during the last use of the given computing system implemented application that is performed on a specific interface display within the given computing system implemented application. For instance, assume the given user exits a video game played via a given computing system implemented application at a given point/stage or mission/task of a video game. Then, in this specific example, upon user launch/activation of the given computing system implemented application, the user is taken directly to the interface display within the given computing system implemented application associated with the given point/stage, or mission/task, the given user was playing when the last use of the given computing system implemented application was terminated. As another example, assume the given user had just completed a given level, or mission/task, of a video game played via a given computing system implemented application when the last use of the given computing system implemented application was terminated. Then, in this specific example, upon user launch/activation of the given computing system implemented application, the user is taken directly to the interface display within the given computing system implemented application associated with the next level, or mission/task, after the level, or mission/task, the given user was using when the last use of the given computing system implemented application was terminated.

In one embodiment, once upon launch of the given computing system implemented application of PROVIDE A GIVEN COMPUTING SYSTEM IMPLEMENTED APPLICATION OPERATION 403, the given user is taken automatically to the interface display, page, or location within the given computing system implemented application the user will likely need to access to perform specific tasks and/or functions of USE THE ONE OR MORE USE PARAMETERS ASSOCIATED WITH THE GIVEN USER TO DETERMINE A LIKELY USER INTERFACE/PAGE WITHIN THE GIVEN COMPUTING SYSTEM IMPLEMENTED APPLICATION THAT WILL BE NEEDED BY THE GIVEN USER TO PERFORM THE ONE OR MORE TASKS OPERATION 415 at UPON LAUNCH OF THE GIVEN COMPUTING SYSTEM IMPLEMENTED APPLICATION, AUTOMATICALLY GO TO THE USER INTERFACE/PAGE WITHIN THE COMPUTING SYSTEM IMPLEMENTED APPLICATION THAT WILL LIKELY BE NEEDED BY THE GIVEN USER TO PERFORM THE ONE OR MORE TASKS OPERATION 417 process flow proceeds to EXIT OPERATION 431. In one embodiment, at EXIT OPERATION 431, Process for self-learning customized application launch 400 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using Process for self-learning customized application launch 400, one or more use parameters associated with, and/or unique to, the given user's use of the given computing system implemented application are determined and one or more use parameters associated with, and/or unique to, the given user's use of the given computing system implemented application are used to automatically alert the user of the potential need to access the given computing system implemented application to perform one or more specific tasks and/or functions using the given computing system implemented application. Therefore, using process for self-learning customized application launch 400, the user is alerted to the potential need to access the given computing system implemented application to perform one or more specific tasks and/or functions based on data collected from the method and system for self-learning customized application launch regarding the user's actual use of the given computing system implemented application, and without any action on the user's part other than using the given computing system implemented application for his or her normal operations.

In addition, using process for self-learning customized application launch 400, one or more use parameters associated with, and/or unique to, the given user's use of the given computing system implemented application are determined and one or more use parameters associated with, and/or unique to, the given user's use of the given computing system implemented application are used to determine which interface display, page, or location within the given computing system implemented application the user may need to access to perform specific identified tasks and/or functions, and, with or without an alert, the user is taken directly to the interface display, page, or location within the given computing system implemented application the user will likely need to access to perform specific tasks and/or functions when the given computing system implemented application is launched, either by user action or automatically; in one embodiment, without any action on the user's part other than using the given computing system implemented application for his or her normal operations and/or, in one embodiment, launching the given computing system implemented application.

As discussed above, using process for self-learning customized application launch 400, upon launch of the given computing system implemented application, any unnecessary display screens/pages are by-passed and the given user is taken automatically to the location/interface display within the computing system implemented application from which the user can perform the one or more specific tasks and/or functions. Consequently, using process for self-learning customized application launch 400, the currently required task of navigating through various, and often multiple, display screens/pages to get to the location/interface display within the computing system implemented application from which the user can perform the desired task is eliminated without requiring any action on the user's part other than using the given computing system implemented application for his or her normal operations and/or, in one embodiment, launching the given computing system implemented application.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "monitoring", "analyzing", "defining", "storing", "saving", "displaying", "generating", "providing", "processing", "receiving", "requesting", "alerting", "launching", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG. s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for self-learning customized application launch comprising:
    providing a given computing system implemented application, the given computing system implemented application being implemented, at least in part, by one or more processors associated with one or more computing systems, the given computing system implemented application being accessible by a given user;
    the given user-accessing the given computing system implemented application to perform one or more activities or functions that the given user normally performs through the given computing system implemented application and to otherwise interact with the given computing system implemented application in the normal course of the given user's normal activities;
    monitoring the given user's activities or interaction with the computing system implemented application using one or more processors associated with one or more computing systems, the monitored activities and interactions include the following:
        specific tasks or functions the given user performs using the given computing system implemented application and interface displays within the given computing system implemented application a user accesses to perform specific tasks or functions;
        a date, or date range, that is associated with specific recurring tasks or functions the given user performs using the given computing system implemented application and what interface display within the given computing system implemented application the user accesses to perform the specific recurring tasks or functions;
        a day of the week, or day range, that is associated with specific recurring tasks or functions the given user performs using the given computing system implemented application and what interface display within the given computing system implemented application the user accesses to perform the specific recurring tasks or functions;
        a time, or time range, that is associated with specific recurring tasks or functions the given user performs using the given computing system implemented application and what interface display within the given computing system implemented application the user accesses to perform the specific recurring tasks or functions;
        the given user's progress within a specific multiple step or multiple level task or function the given user is performing using the given computing system implemented application and what interface display within the given computing system implemented application the user will need to access to continue with the specific multiple step or multiple level task or function from the point of last use of the given computing system implemented application; and
        specific recurring content associated with specific recurring tasks or functions the given user performs using the given computing system implemented application and what interface display within the given computing system implemented application the user accesses to perform the specific recurring tasks or functions;
    using one or more processors associated with one or more computing systems to generate data representing at least part of the given user's monitored activities or interaction with the given computing system implemented application;
    based, at least in part, on the generated data, using one or more processors associated with one or more computing systems to automatically generate and deliver an alert to the given user, the alert notifying the given user of the need to access the given computing system implemented application to perform one or more specific tasks or functions using the given computing system implemented application.

2. The computing system implemented process for self-learning customized application launch of claim 1, wherein;
the given computing system implemented application is selected from the group of computing system implemented applications consisting of:
a computing system implemented, or web-based, payroll system, package, program, module, or application;
a computing system implemented, or web-based, accounting or invoicing system, package, program, module, or application;
a computing system implemented, or web-based, financial management system, package, program, module, or application;
a computing system implemented, or web-based, banking system, package, program, module, or application;
a computing system implemented, or web-based, personal financial management system, package, program, module, or application;
a computing system implemented, or web-based, small business financial management system, package, program, module, or application;
a computing system implemented, or web-based, business system, package, program, module, or application;
a computing system implemented, or web-based, marketing device distribution system, package, program, module, or application;
a computing system implemented, or web-based, financial institution financial management system, package, program, module, or application;
a computing system implemented, or web-based, tax preparation system, package, program, module, or application;
a computing system implemented, or web-based, business or point of sale system, package, program, module, or application;
a computing system implemented, or web-based, healthcare management system, package, program, module, or application;
a computing system implemented, or web-based, gaming or entertainment-based system, package, program, module, or application;
a computing system implemented, or web-based, auction system, package, program, module, or application;
a computing system implemented, or web-based, sales system, package, program, module, or application; and
a computing system implemented, or web-based, social networking or communication system, package, program, module, or application.

3. The computing system implemented process for self-learning customized application launch of claim 1, wherein;
the given user accesses the given computing system implemented application via an access means selected from the group of access means consisting of:
one or more desktop computing systems;
one or more mobile computing systems;
one or more private networks;
one or more public networks, such as the Internet;
one or more web-pages;
one or more web-sites;
one or more web-based functions; and
one or more computer program products.

4. The computing system implemented process for self-learning customized application launch of claim 1, wherein;
the given user's activities or interaction with the computing system implemented application are monitored for a defined period of time.

5. The computing system implemented process for self-learning customized application launch of claim 1, wherein;
the type of alert notifying the given user of the need to access the given computing system implemented application to perform one or more specific tasks or functions using the given computing system implemented application is selected from the group of alert types consisting of:
an e-mail alert;
a text message alert;
an Instant Message (IM) alert;
a phone call;
a pop-up display;
a FAX alert;
an audio alert;
a physical alert;
a calendar alert;
an alert automatically sent to another application; and
a printed alert.

6. A computing system implemented process for self-learning customized application launch comprising:
providing a given computing system implemented application, the given computing system implemented application being implemented, at least in part, by one or more processors associated with one or more computing systems, the given computing system implemented application being accessible by a given user;
the given user accessing the given computing system implemented application to perform one or more activities or functions that the given user normally performs through the given computing system implemented application and to otherwise interact with the given computing system implemented application in the normal course of the given user's normal activities;
monitoring the given user's activities or interaction with the computing system implemented application using one or more processors associated with one or more computing systems, the monitored activities and interactions include the following:
specific tasks or functions the given user performs using the given computing system implemented application and interface displays within the given computing system implemented application the user accesses to perform specific tasks or functions;
a date, or date range, that is associated with specific recurring tasks or functions the given user performs using the given computing system implemented application and what interface display within the given computing system implemented application the user accesses to perform the specific recurring tasks or functions;
a day of the week, or day range, that is associated with specific recurring tasks or functions the given user performs using the given computing system implemented application and what interface display within the given computing system implemented application the user accesses to perform the specific recurring tasks or functions;
a time, or time range, that is associated with specific recurring tasks or functions the given user performs using the given computing system implemented application and what interface display within the given computing system implemented application the user accesses to perform the specific recurring tasks or functions;
the given user's progress within a specific multiple step or multiple level task or function the given user is performing using the given computing system implemented application and what interface display within the given computing system implemented application the user will need to access to continue with the specific multiple step or multiple level task or function from the point of last use of the given computing system implemented application; and specific recurring content associated with specific recurring tasks or functions the given user performs using the given computing system implemented application and what interface display within the given computing system implemented application the user accesses to perform the specific recurring tasks or functions;

using one or more processors associated with one or more computing systems to generate data representing at least part of the given user's monitored activities or interaction with the given computing system implemented application;

based, at least in part, on the generated data, using one or more processors associated with one or more computing systems to determine an interface display, page, or location, within the given computing system implemented application the given user may need to access to perform specific identified tasks or functions; and upon launch of the given computing system implemented application, automatically taking the given user to the interface display, page, or location within the given computing system implemented application the user will likely need to access to perform the specific tasks or functions.

7. The computing system implemented process for self-learning customized application launch of claim 6, wherein;
the given computing system implemented application is selected from the group of computing system implemented applications consisting of:
a computing system implemented, or web-based, payroll system, package, program, module, or application;
a computing system implemented, or web-based, accounting or invoicing system, package, program, module, or application;
a computing system implemented, or web-based, financial management system, package, program, module, or application;
a computing system implemented, or web-based, banking system, package, program, module, or application;
a computing system implemented, or web-based, personal financial management system, package, program, module, or application;
a computing system implemented, or web-based, small business financial management system, package, program, module, or application;
a computing system implemented, or web-based, business system, package, program, module, or application;
a computing system implemented, or web-based, marketing device distribution system, package, program, module, or application;
a computing system implemented, or web-based, financial institution financial management system, package, program, module, or application;
a computing system implemented, or web-based, tax preparation system, package, program, module, or application;
a computing system implemented, or web-based, business or point of sale system, package, program, module, or application;
a computing system implemented, or web-based, healthcare management system, package, program, module, or application;
a computing system implemented, or web-based, gaming or entertainment-based system, package, program, module, or application;
a computing system implemented, or web-based, auction system, package, program, module, or application;
a computing system implemented, or web-based, sales system, package, program, module, or application; and
a computing system implemented, or web-based, social networking or communication system, package, program, module, or application.

8. The computing system implemented process for self-learning customized application launch of claim 6, wherein;
the given user accesses the given computing system implemented application via an access means selected from the group of access means consisting of:
one or more desktop computing systems;
one or more mobile computing systems;
one or more private networks;
one or more public networks, such as the Internet;
one or more web-pages;
one or more web-sites;
one or more web-based functions; and
one or more computer program products.

9. The computing system implemented process for self-learning customized application launch of claim 6, wherein;
the given user's activities or interaction with the computing system implemented application are monitored for a defined period of time.

10. The computing system implemented process for self-learning customized application launch of claim 6, wherein;
the given computing system implemented application is launched by the given user and the given user is taken automatically to the interface display, page, or location within the given computing system implemented application the user will likely need to access to perform the specific tasks or functions.

11. The computing system implemented process for self-learning customized application launch of claim 6, wherein;
the given computing system implemented application is automatically launched and the given user is taken automatically to the interface display, page, or location within the given computing system implemented application the user will likely need to access to perform the specific tasks or functions.

12. A system for self-learning customized application launch comprising:
one or more computing systems;
a given computing system implemented application, the given computing system implemented application being implemented, at least in part, by one or more processors associated with the one or more computing systems, the given computing system implemented application being accessible by a given user;
a process for self-learning customized application launch, the process for self-learning customized application launch being implemented, at least in part, by the one or more processors associated with the one or more computing systems, the process for self-learning customized application launch comprising:
monitoring the given user's activities or interaction with the computing system implemented application using the one or more processors associated with the one or more computing systems, the monitored activities and interactions include at least two of the following:

specific tasks or functions the given user performs using the given computing system implemented application and interface displays within the given computing system implemented application the user accesses to perform specific tasks or functions;

a date, or date range, that is associated with specific recurring tasks or functions the given user performs using the given computing system implemented application and what interface display within the given computing system implemented application the user accesses to perform the specific recurring tasks or functions;

a day of the week, or day range, that is associated with specific recurring tasks or functions the given user performs using the given computing system implemented application and what interface display within the given computing system implemented application the user accesses to perform the specific recurring tasks or functions;

a time, or time range, that is associated with specific recurring tasks or functions the given user performs using the given computing system implemented application and what interface display within the given computing system implemented application the user accesses to perform the specific recurring tasks or functions;

the given user's progress within a specific multiple step or multiple level task or function the given user is performing using the given computing system implemented application and what interface display within the given computing system implemented application the user will need to access to continue with the specific multiple step or multiple level task or function from the point of last use of the given computing system implemented application; and specific recurring content associated with specific recurring tasks or functions the given user performs using the given computing system implemented application and what interface display within the given computing system implemented application the user accesses to perform the specific recurring tasks or functions;

using the one or more processors associated with the one or more computing systems to generate data representing at least part of the given user's monitored activities or interaction with the given computing system implemented application;

based, at least in part, on the generated data, using the one or more processors associated with the one or more computing systems to determine an interface display, page, or location, within the given computing system implemented application the given user may need to access to perform specific identified tasks or functions; and upon launch of the given computing system implemented application, automatically taking the given user to the interface display, page, or location within the given computing system implemented application the user will likely need to access to perform the specific tasks or functions.

13. The system for self-learning customized application launch of claim 12, wherein;

the given computing system implemented application is selected from the group of computing system implemented applications consisting of:

a computing system implemented, or web-based, payroll system, package, program, module, or application;

a computing system implemented, or web-based, accounting or invoicing system, package, program, module, or application;

a computing system implemented, or web-based, financial management system, package, program, module, or application;

a computing system implemented, or web-based, banking system, package, program, module, or application;

a computing system implemented, or web-based, personal financial management system, package, program, module, or application;

a computing system implemented, or web-based, small business financial management system, package, program, module, or application;

a computing system implemented, or web-based, business system, package, program, module, or application;

a computing system implemented, or web-based, marketing device distribution system, package, program, module, or application;

a computing system implemented, or web-based, financial institution financial management system, package, program, module, or application;

a computing system implemented, or web-based, tax preparation system, package, program, module, or application;

a computing system implemented, or web-based, business or point of sale system, package, program, module, or application;

a computing system implemented, or web-based, healthcare management system, package, program, module, or application;

a computing system implemented, or web-based, gaming or entertainment-based system, package, program, module, or application;

a computing system implemented, or web-based, auction system, package, program, module, or application;

a computing system implemented, or web-based, sales system, package, program, module, or application; and a computing system implemented, or web-based, social networking or communication system, package, program, module, or application.

14. The system for self-learning customized application launch of claim 12, wherein;

the given user accesses the given computing system implemented application via an access means selected from the group of access means consisting of:

one or more desktop computing systems;

one or more mobile computing systems;

one or more private networks;

one or more public networks, such as the Internet;

one or more web-pages;

one or more web-sites;

one or more web-based functions; and one or more computer program products.

15. The system for self-learning customized application launch of claim 12, wherein;

the given user's activities or interaction with the computing system implemented application are monitored for a defined period of time.

16. The system for self-learning customized application launch of claim 12, wherein;

the given computing system implemented application is launched by the given user and the given user is taken automatically to the interface display, page, or location within the given computing system implemented application the user will likely need to access to perform the specific tasks or functions.

17. The system for self-learning customized application launch of claim 12, wherein;

the given computing system implemented application is automatically launched and the given user is taken automatically to the interface display, page, or location within the given computing system implemented application the user will likely need to access to perform the specific tasks or functions.

18. A system for self-learning customized application launch comprising:

a user computing system;

a given computing system implemented application, the given computing system implemented application being implemented, at least in part, by one or more processors associated with the user computing system, the given computing system implemented application being accessible by a given user;

a process for self-learning customized application launch, the process for self-learning customized application launch being implemented, at least in part, by the one or more processors associated with the user computing system, the process for self-learning customized application launch comprising:

monitoring the given user's activities or interaction with the computing system implemented application using the one or more processors associated with user computing system, the monitored activities and interactions include the following:

specific tasks or functions the given user performs using the given computing system implemented application and interface displays within the given computing system implemented application the user accesses to perform specific tasks or functions;

a date, or date range, that is associated with specific recurring tasks or functions the given user performs using the given computing system implemented application and what interface display within the given computing system implemented application the user accesses to perform the specific recurring tasks or functions:

a day of the week, or day range, that is associated with specific recurring tasks or functions the given user performs using the given computing system implemented application and what interface display within the given computing system implemented application the user accesses to perform the specific recurring tasks or functions;

a time, or time range, that is associated with specific recurring tasks or functions the given user performs using the given computing system implemented application and what interface display within the given computing system implemented application the user accesses to perform the specific recurring tasks or functions;

the given user's progress within a specific multiple step or multiple level task or function the given user is performing using the given computing system implemented application and what interface display within the given computing system implemented application the user will need to access to continue with the specific multiple step or multiple level task or function from the point of last use of the given computing system implemented application; and specific recurring content associated with specific recurring tasks or functions the given user performs using the given computing system implemented application and what interface display within the given computing system implemented application the user accesses to perform the specific recurring tasks or functions;

using the one or more processors associated with user computing system to generate data representing at least part of the given user's monitored activities or interaction with the given computing system implemented application;

based, at least in part, on the generated data, using the one or more processors associated with user computing system to determine an interface display, page, or location, within the given computing system implemented application the given user may need to access to perform specific identified tasks or functions; and upon launch of the given computing system implemented application, automatically taking the given user to the interface display, page, or location within the given computing system implemented application the user will likely need to access to perform the specific tasks or functions.

\* \* \* \* \*